United States Patent [19]
Barrett

[11] 3,971,223
[45] July 27, 1976

[54] PROTECTION METHOD

[75] Inventor: Joseph Edward Barrett, Twickenham, England

[73] Assignee: The British Petroleum Company Limited, London, England

[22] Filed: Dec. 4, 1974

[21] Appl. No.: 529,270

[30] Foreign Application Priority Data
Dec. 12, 1973 United Kingdom............... 57472/73
Mar. 19, 1974 United Kingdom............... 12049/74

[52] U.S. Cl.................................. 61/36 R; 61/1 R; 427/136
[51] Int. Cl.²........................ E02B 5/02; E02D 3/12
[58] Field of Search............... 427/136, 138; 61/1 R, 61/35, 36 R, 37, 38

[56]  References Cited
UNITED STATES PATENTS

| | | | |
|---|---|---|---|
| 3,383,863 | 5/1968 | Berry | 61/1 R |
| 3,474,625 | 10/1969 | Draper et al. | 61/1 R |
| 3,555,828 | 1/1971 | Goldstein et al. | 61/1 R |
| 3,744,255 | 7/1973 | Jacobs et al. | 61/37 |

OTHER PUBLICATIONS

"Mulenide" 2 pages Berry Construction Co., Technical Publication.

"Glass Fiber Pond" by B. Volg, Popular Mechanics, p. 164 July 1956.

*Primary Examiner*—Paul R. Gilliam
*Assistant Examiner*—Alex Grosz
*Attorney, Agent, or Firm*—Brooks Haidt Haffner & Delahunty

[57]   ABSTRACT

Ground surfaces are rendered impervious by first covering the ground with netting and then spraying glass fiber and polyester resin on the netting and allowing it to cure.

11 Claims, No Drawings

PROTECTION METHOD

The present invention relates to a process for the treatment of ground surfaces to render them impervious and to ground surfaces when so treated. The invention is particularly useful for rendering ground surfaces impervious to hydrocarbon liquids.

By hydrocarbon liquids are meant throughout this specification the crude hydrocarbon materials entering and the refined hydrocarbon products leaving oil refineries together with any intermediate products, which materials are liquids at normal temperatures and pressures. Typical examples of these are crude oil per se, straight run naphtha, heavy gas oils, atmospheric residues and motor gasoline reformates, including the high aromatic content, e.g. around 65%, reformates.

It is common practice for reasons of safety in the oil industry to erect storage tanks for hydrocarbon liquids in areas known as bunds. These are basin-like areas surrounded by dykes, capable of containing within the bund the total liquid content of the tanks and any tidal wave caused by its escape and thereby localising the harmful effect of any damage to the tanks. Until recently, it has only been necessary for the bund to prevent any overflow of spillage in order to meet the various international safety regulations. However, it has now been found desirable and indeed necessary to meet new regulations, for the bund to prevent seepage of the hydrocarbon liquids into the earth on which the bund is located. Furthermore, if the ground beneath a storage tank can be rendered impervious to hydrocarbon liquids, any leakage from the tank can be more readily perceived.

Copending U.S. patent application Ser. No. 386,621, now abandoned, discloses a method for the treatment of ground surfaces to render them impervious to hydrocarbon liquids which comprises forming a continuous, cured glass fibre reinforced unsaturated polyester resin sheet on top of a membrane which prevents loss of unsaturated polyester resin prior to its cure and which is sufficiently flexible to conform to the contours of the ground surface under the weight of the uncured resin. This method gives excellent results and leads to improved techniques for erecting oil storage tanks and the like. However, there is a tendency to use more resin than strictly necessary in order to ensure that a glass fibre reinforced sheet of sufficient thickness is built up. This is due to the fact that it is difficult when applying the resin to the membrane to gauge the thickness of the sheet as it is formed. Furthermore, the process calls for very exact working when lining the sloping walls of a bund area if drainage of the polyester resin from the walls before it has cured it to be avoided.

An object of the present invention is to provide an improved process for rendering ground surfaces, e.g. bund areas and the like impervious to hydrocarbon liquids.

Accordingly the present invention provides a method for the treatment of a ground surface to render it impervious which comprises covering the surface with a sheet mesh structure and spraying glass fibre reinforcement and unsaturated polyester resin on to the sheet mesh structure and causing the resin to cure around the sheet mesh structure.

The expression "unsaturated polyester" is used throughout this specification in its normal sense as covering the polycondensation products of dicarboxylic acids or anhydrides with dihydroxyl alcohols when one of the reactants present during the polycondensation reaction contains a polymerisable double bond. Unsaturated polyesters can be modified by the presence in the polycondensation reaction mixture of monocarboxylic acids, monohydroxyl alcohols and small amounts of polycarboxylic acids or polyhydroxyl alcohols. Particularly valuable unsaturated polyesters are obtained by esterifying saturated dihydric alcohols, such as ethylene glycol, or its precursor ethylene oxide, diethylene glycol, triethylene glycol, trimethylene glycol, α-propylene glycol, or its precursor propylene oxide, 1:3 butylene glycol and the bisphenol A adducts with ethylene oxide and propylene oxide with α-unsaturated, α,β-dicarboxylic acids, such as maleic, fumaric, itaconic and citraconic acids. This type of unsaturated polyester may be modified by replacing some of the unsaturated dicarboxylic acid with an equivalent quantity of a saturated dicarboxylic acid, for example, succinic, adipic, sebacic, phthalic, isophthalic, azelaic, tetrahydrophthalic, or hexachloroendomethylene tetrahydrophthalic acids.

Unsaturated polyesters are generally cured in the presence of an ethylenically unsaturated monomer capable of copolymerising with the unsaturated polyester. Examples of such monomers are styrene, which is the most commonly employed, vinyl toluene, α-methyl styrene, methyl methacrylate, ethylene glycol dimethacrylate, ethyl acrylate, acrylonitrile, vinyl acetate, diallyl phthalate, diallyl maleate and triallyl cyanurate.

The rate of cure of unsaturated polyesters and their mixtures with copolymerisable monomers is increased by the presence of polymerisation initiators which include organic peroxides such as benzoyl peroxide, lauryl peroxide, isopropyl benzene hydroperoxide, methyl ethyl ketone peroxide and 1-hydroxy cyclohexyl hydroperoxide-1. The rate of cure of the polyester resin may also be modified by the addition of suitable inhibitors, such as hydroquinone, alpha-naphthol, t-butyl catechol, benzaldehyde or tetra chloroquinone, and promoters such as certain amines like dimethyl aniline, diethyl aniline di-n-propyl aniline, dimethyl-para-toluidine, diethyl-α-naphthylamine, para-di-methyl-amino azobenzene and dimethyl metaaminophenol and metallic salts such as vanadium, cobalt and manganese octoates and naphthenates. The use of such curing initiators, promoters and inhibitors in a balanced system enables the curing of the polyester resin to be brought about in the required time at the varied ambient conditions i.e. from the high temperature of Middle Eastern Oil fields to the low temperatures of some North American Oil fields, in which the process of the present invention is applicable. In particular, where the ambient temperature is sufficiently low to cause inhibition of the resin, a wax, such as paraffin wax can be added in an amount from 0.01 to 0.1 wt % based on the weight of the resin.

Filler materials, fire retardant additives and pigments, such as carbon black and antimony trioxide can be added to the polyester resin system to enable a more visible laminate to be laid and, in the case of carbon black, to reduce the possibility of static electricity build up, and, in the case of antimony trioxide to give fire retardancy.

The sheet mesh structure must essentially be flexible so that it is flattened against the ground surface when the glass fibres and resin are sprayed on to it. The mesh structure is suitably made from plastics materials and thus plastics netting e.g. the "Netlon" materials can be used. Typically mesh size of from ½ to 1½ are suitable. The relative proportion of mesh area to the area of the material forming the sheet mesh structure can vary from netting to holed sheet material, the holes preferably taking up at least 75% of the area of the whole sheet. In this way one can ensure that the mesh sheet is sufficiently flexible. It has been found that the desired thickness for the mesh structure is most economically and readily formed using filament netting in which the filaments have a controlled thickness as do their crossover points in the netting.

When the sheet mesh structure is made from a plastics material useful plastics are polyvinyl chloride and high and low density polyethylene.

The glass fibre reinforcement used in the process of the present invention can be in any form that can be sprayed on to the mesh structure. In a preferred aspect of the present invention, the glass fibre is in the form of chopped rovings.

As stated above the cure of the polyester resin system is suitably brought about by the presence in the system of a polymerisation initiator. In the method of the present invention it is essential that polyester resin cures around the sheet mesh structure, i.e. the structure becomes part of a cured polyester resin sheet covering the ground surface, and is not lost in the ground surface to any great extent before it is cured. This can be achieved by treatment of the surface with, for example, polymer latices to reduce ground permeability before applying the method of the present invention. A preferred way to ensure minimum loss of polyester resin is to cover the ground surface to be treated with a membrane which is sufficiently flexible to conform to the contours of the surface under the force of the sprayed glass fibres and resin. The flexible sheet mesh structure is then laid on the membrane and the glass fibre reinforcement and polyester resin sprayed on top. The membrane prevents loss of polyester resin into the ground surface and thus the polyester is cured around the sheet mesh material.

The membrane can be made of any material which is sufficiently impervious to the chosen unsaturated polyester resin to prevent any substantial quantity of the polyester resin from seeping away from the sheet mesh structure and the glass fibre reinforcement into the ground being treated before the resin has set. The preferred membrane for use in the process of the present invention is polyethylene sheet, e.g. film material made from either high or low density polyethylene, and polyvinyl acetate sheet. The membrane need not be a continuous sheet covering the whole area and can, in practice, consist of a plurality of overlapping strips arranged so that there is sufficient area of overlap between one sheet and the next to prevent any substantial seepage of polyester resin into the ground before the resin has set.

Preferably the sheet mesh structure is attached to the membrane so that the two sheet materials can be laid on the ground at the same time. There is no need to attach the sheet mesh structure to the membrane over its surface entirely and, for example, occasional spot welds are quite satisfactory. It is found that as the glass fibres and resin system are sprayed onto the sheets they tend to force the flexible mesh structure against the membrane where it is held by the weight of the fibres and the resin.

According to a further aspect of the present invention the mesh structure can be arranged to have a thickness less than the desired thickness of the GRP sheet formed by curing the glass fibre reinforcement and the unsaturated polyester resin and then it can be used to gauge the amount of fibre and polyester to be employed. This aspect of the invention is preferably used in conjunction with a membrane to prevent loss of polyester into the ground surface prior to its cure. Thus the present invention further provides a method for forming a glass fibre reinforced unsaturated polyester resin (GRP) sheet on a ground surface which comprises covering the surface with a membrane which is sufficiently flexible to conform to the contours of the ground surface under the force of the sprayed glass fibres and resin, arranging a flexible sheet mesh structure on the membrane, said structure having a thickness less than the desired thickness of the GRP sheet, and applying glass fibres and unsaturated polyester resin onto the membrane/mesh structure to the desired thickness as indicated by the visual appearance or disappearance of the mesh in the glass/resin mixture.

In this embodiment the sheet mesh structure is suitably pigmented in order to ensure that it can be easily distinguished from or visible in the unsaturated polyester resin/glass fibre mixture that is sprayed on to it. The resin system may also be pigmented in a contrasting colour so that it is easy for the resin/glass spraying operator to see immediately the mesh structure is covered. If the spraying is stopped at this point the resin/glass layer will have approximately the same thickness as the mesh structure. In practice however it is often convenient to use a clear or only lightly pigmented resin so that the mesh structure is visible through it. Thus as spraying continues after the mesh is first covered the latter becomes slowly less distinct as the thickness of the GRP layer increases. Thus the spraying can be continued until the intensity of the visual image of the mesh is at a level which previous trial sprayings will have shown gives the desired thickness of GRP sheet. Using this technique it is possible for the spraying operator to provide two thicknesses of GRP sheet by, for example, spraying one area to give a desired intensity to the mesh in the resin and another so that the mesh just disappears from view.

The unsaturated polyester resin is suitably applied with the glass fibre reinforcement to the sheet mesh structure by any of the methods well-known in the art for the preparation of glass fibre reinforced articles by a glass/resin spraying technique. In a preferred aspect of the present invention the glass fibre in the form of continuous rovings is fed to an application gun, together with a supply of catalysed unsaturated polyester resin, the glas fibre is chopped into short strands at the gun and sprayed, with the resin, onto the sheet mesh structure and, if present, the membrane. The sprayed material is then immediately rolled and the GRP sheet checked for thickness by studying the intensity of the image of the mesh structure in the polyester resin or by ensuring that the resin is just of a thickness to cause the mesh structure to disappear from view.

The method of the present invention is particularly useful when it is desired to render a sloping ground surface impervious; the sheet mesh structure can prevent drainage of unsaturated polyester resin from the sloping surface before it has had time to set to form the GRP layer.

In this embodiment the sheet mesh structure can be as described above, although it is possible to use a structure having a reduced area of holes. For example, the holes can take up only about 25% of the whole sheet. When such sheet material is employed it is desirable that the sheet shall be made with a rough surface which can further reduce the tendency of the resin to run down the sloping wall before cure is effected. The sheet mesh structure need not be continuous over the whole sloping area and can, in practice, consist of a plurality of overlapping strips.

In practice it is convenient to peg the sheet mesh structure and, if used, the backing membrane to any sloping surface before spraying the glass fibre reinforcement and polyester resin on to it.

EXAMPLE

In forming a GRP sheet having a minimum thickness of 2.5 mm on a ground surface according to the method described in the hereinbefore mentioned copending application, it was found that in order to ensure the minimum thickness the final sheet contained 0.9 kilograms of glass per square meter. The same spraying conditions of glass fibre and resin were used by the same operator to cover a membrane of polyethylene to which was attached a ¾ inch square mesh netting made from flexible wire having a suitable diameter to act as a gauge for a GRP sheet having the desired thickness. The netting was grey in colour and the resin system unpigmented. When a GRP sheet having a 2.5 mm thickness was formed the netting remained just visible. The spray operator formed a GRP sheet in which the netting was just visible using less than 0.9 kilograms of glass per square meter. Examination of formed GRP sheet showed it consistently had the desired thickness and had less variation in thickness than the GRP sheet formed directly on the polyethylene membrane in the absence of the square mesh netting.

Similar results are obtained when the netting used above is replaced by blue plastics netting of similar mesh size in which the diameter of the strands forming the netting is approximately 2 millimeters.

I claim:

1. A method for forming a glass fiber reinforced unsaturated polyester resin (GRP) sheet on a ground surface which comprises covering the surface with a membrane which is sufficiently flexible to conform to the contours of the ground surface under the force of the sprayed glass fibers and resin, arranging a flexible sheet mesh structure on the membrane, said structure having a thickness less than the desired thickness of the GRP sheet but of sufficient thickness to prevent drainage of said polyester resin from a sloping ground surface, and applying glass fibers and unsaturated polyester resin onto the membrane/mesh structure to the desired thickness using the thickness, color and visual appearance of said mesh structure to gauge the thickness of said GRP sheet.

2. A method as claimed in claim 1 wherein the unsaturated polyester resin contains carbon black.

3. A method as claimed in claim 1 wherein the sheet mesh structure has a mesh size of from a ½ to 1½ inches.

4. A method as claimed in claim 1 wherein the holes in the sheet mesh structure take up at least 75% of the area of the whole sheet.

5. A method as claimed in claim 1 wherein the sheet mesh structure is filament netting.

6. A method as claimed in claim 1 wherein the glass fibre reinforcement is in the form of chopped rovings.

7. A method as claimed in claim 1 wherein the membrane is polyethylene sheet or polyvinyl acetate sheet.

8. A method as claimed in claim 1 wherein the sheet mesh structure is attached to the membrane before it is laid on the ground surface.

9. A method as claimed in claim 1 wherein the sheet mesh structure has a thickness less than the desired thickness of the GRP sheet formed by curing the glass fibre reinforcement and the unsaturated polyester resin.

10. A method as claimed in claim 1 when applied to a sloping ground surface.

11. A method as claimed in claim 1 wherein the sheet mesh structure and/or the unsaturated polyester resin is pigmented.

* * * * *

UNITED STATES PATENT AND TRADEMARK OFFICE
CERTIFICATE OF CORRECTION

PATENT NO. : 3,971,223
DATED : July 27, 1976
INVENTOR(S) : JOSEPH EDWARD BARRETT It is certified that error appears in the above-identified patent and that said Letters Patent are hereby corrected as shown below:

Col. 1, line 54, after "cured", change "it" to --is--

Col. 2, line 54, after "cause" and before "inhibition" insert --air--

Col. 4, line 52, correct the spelling of "glass"

Signed and Sealed this

Eighth Day of February 1977

[SEAL]

Attest:

RUTH C. MASON
Attesting Officer

C. MARSHALL DANN
Commissioner of Patents and Trademarks